United States Patent
Buck

(10) Patent No.: US 9,367,240 B2
(45) Date of Patent: Jun. 14, 2016

(54) GRAPHICAL USER INTERFACE FOR IMPROVED TEXT CHARACTER ENTRY

(71) Applicant: LOOKOUT, INC., San Francisco, CA (US)

(72) Inventor: Brian James Buck, Livermore, CA (US)

(73) Assignee: LOOKOUT, INC., San Francisco, CA (US)

( * ) Notice: Subject to any disclaimer, the term of this patent is extended or adjusted under 35 U.S.C. 154(b) by 394 days.

(21) Appl. No.: 13/784,414

(22) Filed: Mar. 4, 2013

(65) Prior Publication Data

US 2014/0181721 A1    Jun. 26, 2014

Related U.S. Application Data

(63) Continuation of application No. 29/440,724, filed on Dec. 26, 2012, now Pat. No. Des. 735,238, and a continuation of application No. 29/440,725, filed on Dec. 26, 2012, now Pat. No. Des. 724,097, and a continuation of application No. 29/440,726, filed on Dec. 26, 2012, now Pat. No. Des. 724,605, and a continuation of application No. 29/441,091, filed on Dec. 31, 2012, now Pat. No. Des. 735,215, and a continuation of application No. 29/441,096, filed on Dec. 31, 2012, now Pat. No. Des. 738,886.

(51) Int. Cl.
   *G06F 3/048* (2013.01)
   *G06F 3/0488* (2013.01)
   *G06F 3/023* (2006.01)

(52) U.S. Cl.
   CPC .......... *G06F 3/04886* (2013.01); *G06F 3/0233* (2013.01)

(58) Field of Classification Search
   CPC ..... G06F 3/0233; G06F 11/14; G06F 3/0362; G06F 3/0489; G06F 3/0202; G06F 3/04886; G06F 1/1616; G06F 1/1656; G06F 1/1662; G06F 3/0219; G06F 3/03547
   See application file for complete search history.

(56) References Cited

U.S. PATENT DOCUMENTS

| | | | |
|---|---|---|---|
| D591,307 S | 4/2009 | Kristensson et al. | |
| D614,644 S | 4/2010 | Kristensson et al. | |
| 7,694,231 B2 * | 4/2010 | Kocienda et al. | ............. 715/773 |
| D640,275 S | 6/2011 | Davis et al. | |
| D640,281 S | 6/2011 | Davis et al. | |
| D640,711 S | 6/2011 | Ng et al. | |
| D664,975 S | 8/2012 | Arnold | |
| D673,170 S | 12/2012 | Davis et al. | |
| D684,588 S | 6/2013 | Gilani | |
| 2001/0048428 A1 * | 12/2001 | Ukita | ..................... G06F 1/1626 345/169 |
| 2002/0168209 A1 * | 11/2002 | Lee | ........................ G06F 3/0219 400/488 |
| 2002/0181671 A1 * | 12/2002 | Logan | ............. H04M 1/274575 379/88.13 |
| 2004/0120583 A1 * | 6/2004 | Zhai | ........................ G06K 9/222 382/229 |
| 2005/0190973 A1 * | 9/2005 | Kristensson | ........... G06K 9/222 382/229 |
| 2005/0244208 A1 * | 11/2005 | Suess | ........................... 400/486 |

(Continued)

*Primary Examiner* — William Bashore
*Assistant Examiner* — Rayeez Chowdhury
(74) *Attorney, Agent, or Firm* — Dergosits & Noah LLP

(57) ABSTRACT

A graphical user interface for improved text character entry is disclosed. In some embodiments, the graphical user interface may be displayed on a mobile communications device. The graphical user interface may display a message field, a soft keyboard, and at least one visual foveal echo field. The message field may display text characters of a message being authored by a user interacting with the soft keyboard. The visual foveal echo field may be placed adjacent to a soft keyboard row and contain a portion of the message being authored by the user.

20 Claims, 16 Drawing Sheets

(56) References Cited

U.S. PATENT DOCUMENTS

| | | |
|---|---|---|
| 2005/0248527 A1 | 11/2005 | Scott |
| 2008/0270896 A1* | 10/2008 | Kristensson .......... G06F 3/0237 715/261 |
| 2009/0158191 A1 | 6/2009 | Varanda |
| 2009/0193334 A1* | 7/2009 | Assadollahi .......... G06F 17/276 715/261 |
| 2011/0055697 A1* | 3/2011 | Davidson ............ G06F 3/04883 715/702 |
| 2011/0063787 A1* | 3/2011 | Griffin ..................... 361/679.08 |
| 2012/0111173 A1* | 5/2012 | Bowen ............................ 84/170 |
| 2012/0114406 A1* | 5/2012 | Cenky ........................... 400/486 |
| 2012/0176320 A1* | 7/2012 | Burrell, IV ................... 345/168 |
| 2013/0125036 A1 | 5/2013 | Griffin et al. |

* cited by examiner

GRAPHICAL USER INTERFACE FOR IMPROVED TEXT CHARACTER ENTRY

CROSS-REFERENCE TO RELATED APPLICATIONS

This patent application claims priority to U.S. Design patent application Ser. No. 29/440,724 entitled Graphical User Interface with Interleaved Rows of Text, filed Dec. 26, 2012; Ser. No. 29/440,725 entitled Graphical User Interface for Reduced Error Key Layout Long Reach, filed Dec. 26, 2012; Ser. No. 29/440,726 entitled Graphical User Interface for Reduced Error Key Layout Short Reach, filed Dec. 26, 2012; Ser. No. 29/441,091 entitled Graphical User Interface With Interleaved Rows Of Text and Reduced Error Key Layout Short Reach, filed Dec. 31, 2012; and Ser. No. 29/441,096 entitled Graphical User Interface With Interleaved Rows Of Text and Reduced Error Key Layout Long Reach, filed Dec. 31, 2012, all of which are incorporated by reference along with all other references cited in this application.

BACKGROUND

Typing on a mobile communications device, especially a smartphone, employs a soft keyboard on the display. The keys of the keyboard are typically positioned below the field where the text message or email is being displayed. A user ordinarily holds the mobile communications device about fifteen (15) inches from their face when typing, most often with the typing being performed with the thumb(s) on smaller devices such as mobile phones; larger devices such as tablets may accommodate a user employing multiple fingers for typing, as on a hard keyboard. But human vision only has high definition vision in a very small region of the visual field. This high definition vision region is located at an angle subtended by about two degrees of arc from the eye. At a distance of fifteen (15) inches, this high definition region corresponds to the inner circle 10 with a diameter of about an inch on the display, as shown in FIG. 1. This inner circle 10 is referred to as foveal vision. The fovea is responsible for sharp central vision, which is necessary in humans for reading, watching, driving, and any activity where visual detail is of primary importance. There is a second region, defined by the annulus between inner circle 10 and the circumference of the outer circle 12. This second region is referred to as para-foveal vision, and is characterized by significantly reduced visual acuity. The area 14 outside of the circumference 12 is the region of peripheral vision, with even more reduction in visual acuity. See http://en.wikipedia.org/wiki/Fovea_centralis and http://en.wikipedia.org/wiki/File:EyeFixationsReading.gif.

A combination of factors leads to typing errors on soft keyboards, especially those keyboards presented on the display of a smartphone. One factor is the size and sensitivity of the character keys on the soft keyboard. The lack of distance between the keys in a particular row of the keyboard leads to inadvertent entry of the key horizontally adjacent to the target key. Another factor is that soft keyboards, unlike hard keyboards, do not provide the user with tactile feedback regarding the position of fingers or thumbs on the keyboard, thus touch typing (typing without looking at the keyboard) is impractical. Yet another factor is the distance between the message field and the soft keyboard. Since it is not possible for the human eye to achieve foveal vision of both the message field and the soft keyboard simultaneously, the user often cannot easily and promptly see that a key-entry error has been made in the message field while the user's vision is focused on the rows of the soft keyboard during typing.

What is needed to reduce typing errors on soft keyboards is a graphical user interface that allows the user to have foveal vision on the recently entered text characters at the same time as having foveal vision on the keyboard. Further, what is needed are keyboard designs that account for the use of thumbs as a primary means of character entry and that provide additional space between keys in rows so that inadvertent selection of a horizontally adjacent key does not occur. Further, what is needed are keyboard designs which provide audio or tactile feedback to the use regarding the relative position of the typing fingers or thumbs relative to the position of the soft keyboard, or which adjust the position or size of the soft keyboard based on the sensed position of the typing fingers or thumbs, or which provide specific audio or tactile feedback to the user based on the key that is typed.

BRIEF SUMMARY OF THE INVENTION

With regard to the foveal vision problems associated with trying to read the message field at the same time as the soft keyboard field, one or more visual foveal echo fields can be provided in locations on the graphical user interface adjacent to, and/or interleaved between the rows of text character keys in the soft keyboard field. Each visual foveal echo field contains one line of the text characters from the message field. In an embodiment, the text characters presented in the visual foveal echo fields "echo" the text characters in the message field closely adjacent to the position of the cursor or to the position of the most recent entry of text characters.

In another embodiment, a vertical up down key is provided on one edge of the soft keyboard field. When the vertical up down key is touched, it presents two separate keys one for up and one for down to permit the user to select the row of text characters in the message field that are to be presented in the at least one visual foveal echo field. In an embodiment, the up and down keys may be tapped once, or repeatedly, or the combination up and down keys may be used as a rubber band control to perform vertical scrolling across multiple lines of text.

The soft keyboard may also include at the end of one of the rows of text character keys a horizontal left right key. When that key is touched, it presents two separate keys, one for left and one for right to permit the user to select the text characters in a particular row in the message field that are presented in the at least one visual foveal echo field. In an embodiment, the left and right keys may be tapped once, or repeatedly, or the combination left and right keys may be used as a rubber band control to perform horizontal scrolling across a line of text.

In order to address the problems associated with the closeness of adjacent text character keys within rows of character keys, new layouts of soft keyboards are presented in which there are six rows of text character keys, arranged with

- the first row having only the text characters Q, W, E, R and T;
- the second row having only the text characters Y, U, I, O and P;
- the third row having only the text characters A, S, D, F and G;
- the fourth row having only the text characters H, J, K and L;
- the fifth row having only the text characters Z, X, C, V and B; and
- the sixth row having the text characters N and M.

In a layout of these six rows especially adapted for use by a user with longer thumbs that can reach most of the way across the smartphone display screen in portrait mode, the first, third and fifth rows are arranged left justified, the second row first character Y is positioned below the first row characters Q and W, the fourth row first character H is positioned below the third row characters S and D, and the sixth row first character N is positioned below the fifth row character C.

In another layout of the six rows of character keys, this layout adapted for users without the longer reach across most of the smartphone display in portrait mode, the first, third and fifth rows are arranged left justified, the second row first character Y is positioned below the first row characters W and E, the fourth row first character H is positioned below the third row characters D and F, and the sixth row first character N is positioned below the fifth row characters V and B. It should be understood that the split row layout can be adapted to any keyboard layout, such as the French AZERTY layout, the Dvorak layout, any international keyboard variation, and any customized layout available to a user.

It is also possible to combine the one or more visual foveal echo fields with the longer reach and shorter reach soft keyboard layouts, such that the one or more visual foveal echo fields appear adjacent to one or more of the six rows of text character keys.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

The present invention is used in the environment of mobile communication devices, such as smart phones, tablet computers, and laptops. Some such devices are available in the marketplace such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS™, Android™ OS, Google Chrome OS, Symbian OS®, Windows Mobile® OS, Windows Phone, BlackBerry OS, Embedded Linux, webOS, Palm OS® or Palm Web OS™. Some specific examples of smart phones include the Droid Incredible and Google Nexus One, provided by HTC Corporation, the iPhone or iPad, both provided by Apple, and many others.

In some specific embodiments of the present invention, a "web browser" application executing on a smartphone enables users to select, access, retrieve, or query information and/or applications stored by server system. Examples of web browsers include the Android browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others (e.g., Google Chrome).

Figure 1:
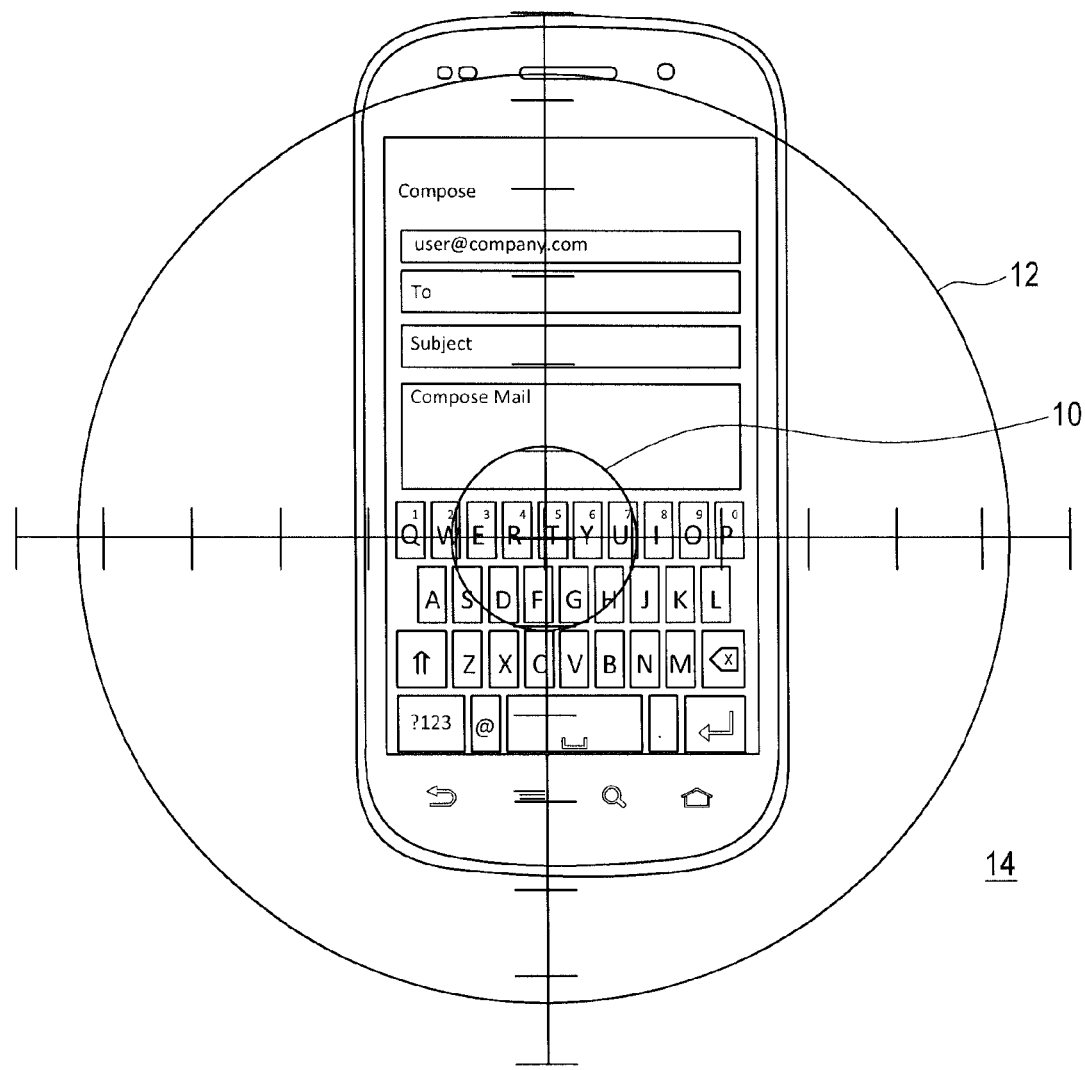
FIG. 1 shows the display of a mobile communications device with a radial presentation of the regions of foveal vision, para-foveal vision and peripheral vision.
Figure 2:
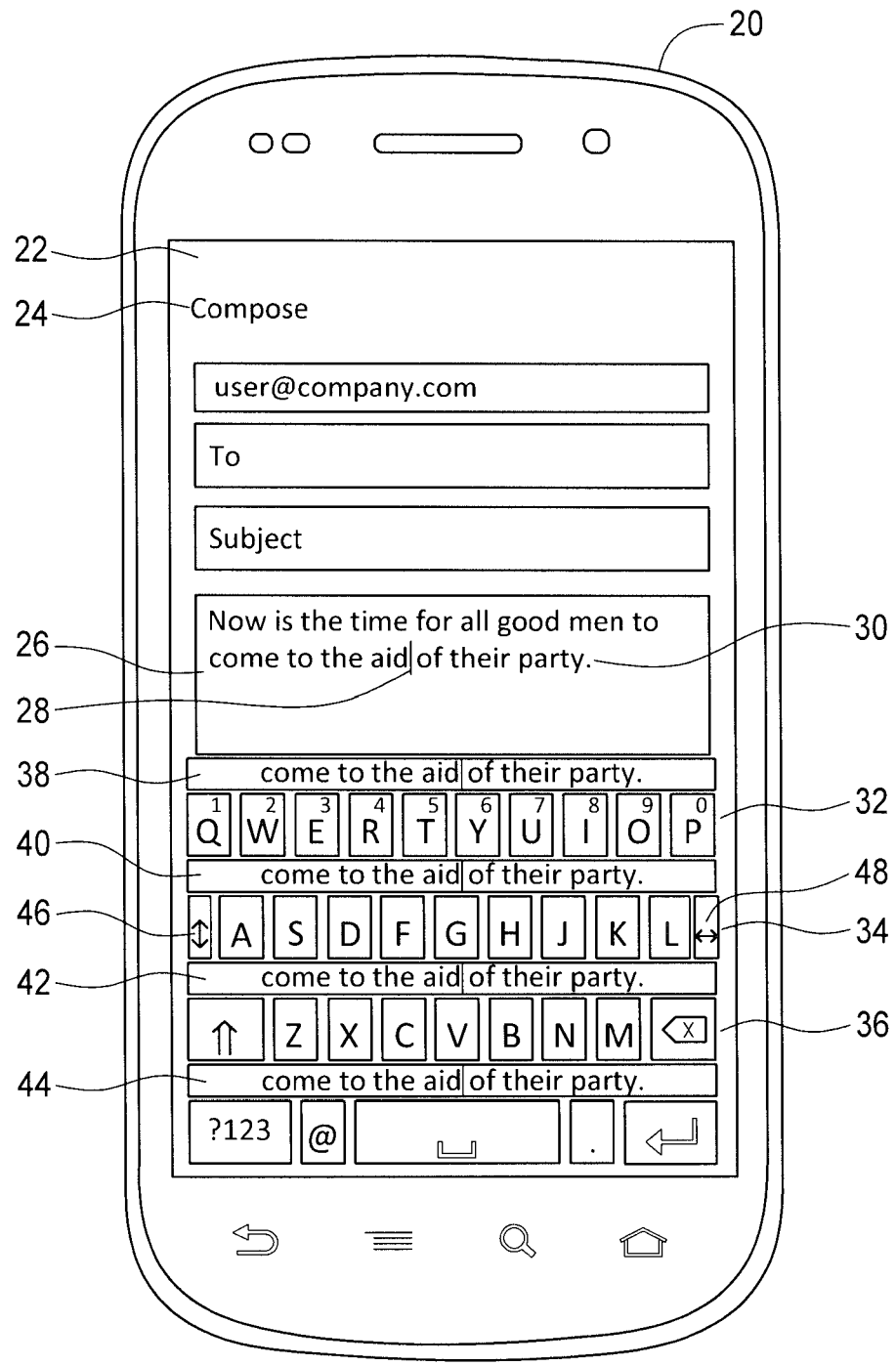
FIG. 2 shows the display of a mobile communications device with a standard QWERTY soft keyboard with four visual foveal echo fields and with up-down and left-right keys added.

FIG. 2 shows an example of a mobile communication device, smartphone 20. Mobile communication or portable electronic devices 20 include a display screen 22. The housing of the smartphone 20 houses familiar computer components, some of which are not shown, such as a processor, memory, battery, speaker, transceiver, antenna, microphone, ports, jacks, connectors, camera, input/output (I/O) controller, display adapter, network interface, mass storage devices, and the like.

The mobile communications device may also include a soft keyboard (e.g., electronic keyboard). In some embodiments, the soft keyboard may be implemented as an input method application. For example, the soft keyboard may be invoked and thus displayed by the mobile communications device when a user indicates an intention to enter or input text (e.g., by tapping a finger in a text entry field). The soft keyboard application may display itself on the screen of the mobile communications device in response to the user's indication and if another application is currently running on the mobile communications device, the other application may either shrink or pan such that the soft keyboard application may display the soft keyboard on the screen of the mobile communications device. Input by the user (e.g., taps on keys of the soft keyboard) is processed by the soft keyboard application and the input (e.g., text) is sent or communicated to the other application. For example, the soft keyboard application may process user input for composing a message for an email application, web browser application, short message service (SMS) texting application, etc. As such, the soft keyboard application may interface with an underlying application associated with the mobile communications device by processing user input and communicating the input with the underlying application.

In some embodiments, the portion of the display of the mobile communications device that is used to present the soft keyboard is controlled by the soft keyboard application. For example, the soft keyboard application may be used to display any type of soft keyboard or keys. As such, the soft keyboard application may display keys in a different sequence, wider keys (e.g., a larger amount of space to display keys of the soft keyboard), or with information or text interleaved within rows of a soft keyboard, as described in further detail below. In some embodiments, the soft keyboard application may take the space of all or a substantial amount of the display of the mobile communications device, provide a text editor, and when a user input of text is completed, the text may be communicated with an underlying application. As such, a soft keyboard application may be used to present a soft keyboard on the display of the mobile communications device, process user input, and communicate the input to an underlying application.

In some embodiments, the soft keyboard application may operate on, but is not limited to, an Android™ OS. In such an example environment, the soft keyboard application may be implemented through a framework architecture such as the input method framework (IMF) architecture that comprises an input method, an input method manager, and underlying applications that interact with the input method manager for control of the input method. For example, the Android™ OS may provide a class (e.g., the InputMethodService class) to allow for the implementation of an input method (e.g., soft keyboard). As such, the soft keyboard application may comprise an input method provided by the Android™ OS that may be used to control the processing and displaying of a soft keyboard. In some embodiments, the input method may comprise an input view and/or a candidates view. The input view may be an area where a user may input text (e.g., from key taps). When the input method is to be displayed, a subclass (e.g., InputMethodService.onCreateInputView) may be called. As such, the subclass may be used to create and return a view hierarchy associated with the soft keyboard. Furthermore, the candidates view may display potential word corrections or completions for user selection by using the Android™ OS subclass InputMethodService.onCreateCandidatesView. The soft keyboard application may further use a subclass InputConnection.sendKeyEvent to communicate text to an application. As such, the InputMethodService may be used to customize the display of a soft keyboard and to invoke or present the soft keyboard on the display of a mobile communications device based on an Android™ OS.

A computer-implemented or computer-executable version of the program instructions useful to practice the systems and techniques described in this application may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the techniques described in this application may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the techniques described in this application may be transmitted via wires, radio waves, or through a network such as the Internet. In another embodiment, a computer program product including a variety of software program code to implement features described in this application is provided.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Windows Phone, Symbian, BlackBerry OS, Palm web OS, bada, Embedded Linux, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows 8, Windows CE. Windows Mobile, Windows Phone 7, Windows Phone 8), Linux, HP-UX, UNIX, Sun OS, Solaris, Mac OS X, Alpha OS, AIX, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the systems and methods in this application using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

SMS and Email Client Discussion

Typing errors occur on soft keyboards, especially when smart phones are held in the portrait orientation leading because there is reduced horizontal distance between keys. Moreover, the narrow radius of the visual foveal region makes it difficult for the user to see the soft keyboard at the same time as the text region where the message is being composed. These problems with typing errors are reduced according to the various embodiments described below.

Visual Foveal Echo Fields

Referring to FIG. 2, the smartphone 20 has a display 22 for the presentation of a graphical user interface. In FIG. 2, the display shows a typical graphical user interface ("GUI") for SMS message composition. This is indicated by the word "Compose" 24 in the upper left hand corner of the display 22. The GUI has a text entry message box 26 in which the message composed by the user is displayed during the "compose" stage. FIG. 2 also shows the cursor 28 at the end of the word "aid" in text line 30. In a typical QWERTY keyboard arrangement, there are three rows 32, 34 and 36 of character keys in the soft keyboard that the user touches to type a message. In the example GUI shown in FIG. 2, there are four visual foveal echo fields 38, 40, 42 and 44, adjacent to and interleaved with the rows of character keys.

The visual foveal echo fields 38, 40, 42 and 44 are "echoes" of the text that is being typed in the message field 26. In the example shown in FIG. 2, the text that is being echoed is the most recent text characters at the text insertion point signified by the cursor 28. The visual foveal echo field or fields occupy a place within the user's visual foveal region, thus the user is actually able to read the text that has been typed, and doesn't have to keep glancing up at the text message field 26 to verify the correctness of the entered text.

There can be just one such visual foveal echo field, or several as shown the example of FIG. 2, with the echo fields positioned adjacent one or more rows 32, 34 and 36 of the soft keyboard character keys.

As will be described in greater detail below with respect to other figures, when there is just one visual foveal echo field, the echo field can be in a fixed position, relative to the rows of character keys, or the one visual foveal echo field can move to a position adjacent a row of character keys based on the last key entered by the user, or based on gaze tracking of the user's vision, or in a device that can sense the proximity of finger (thumb) position even when the finger is not in contact with the device, based on the sensed finger proximity location.

In any of these configurations of the one visual foveal echo field, the text insertion point where the cursor 28 is last located can be positioned at the center of the visual foveal echo field, or the text insertion point can be placed closer to the sensed or inferred foveal region location (based on last key entered, or gaze tracking, or proximity of sensed finger location).

FIG. 2 also shows the addition of up-down ↕ control key 46 and left-right ↔ control key 48 at the respective ends of the row 34. These keys do not have to be placed in this particular row, but they are so placed in this example. The purpose of up-down ↕ control key 46 is to permit the user to move the text insertion point (28) up or down within the message field 26. When this action is taken, the current text insertion point is moved, and the visual foveal echo field or fields are populated with the text characters surrounding the new text insertion point.

Figure 3:
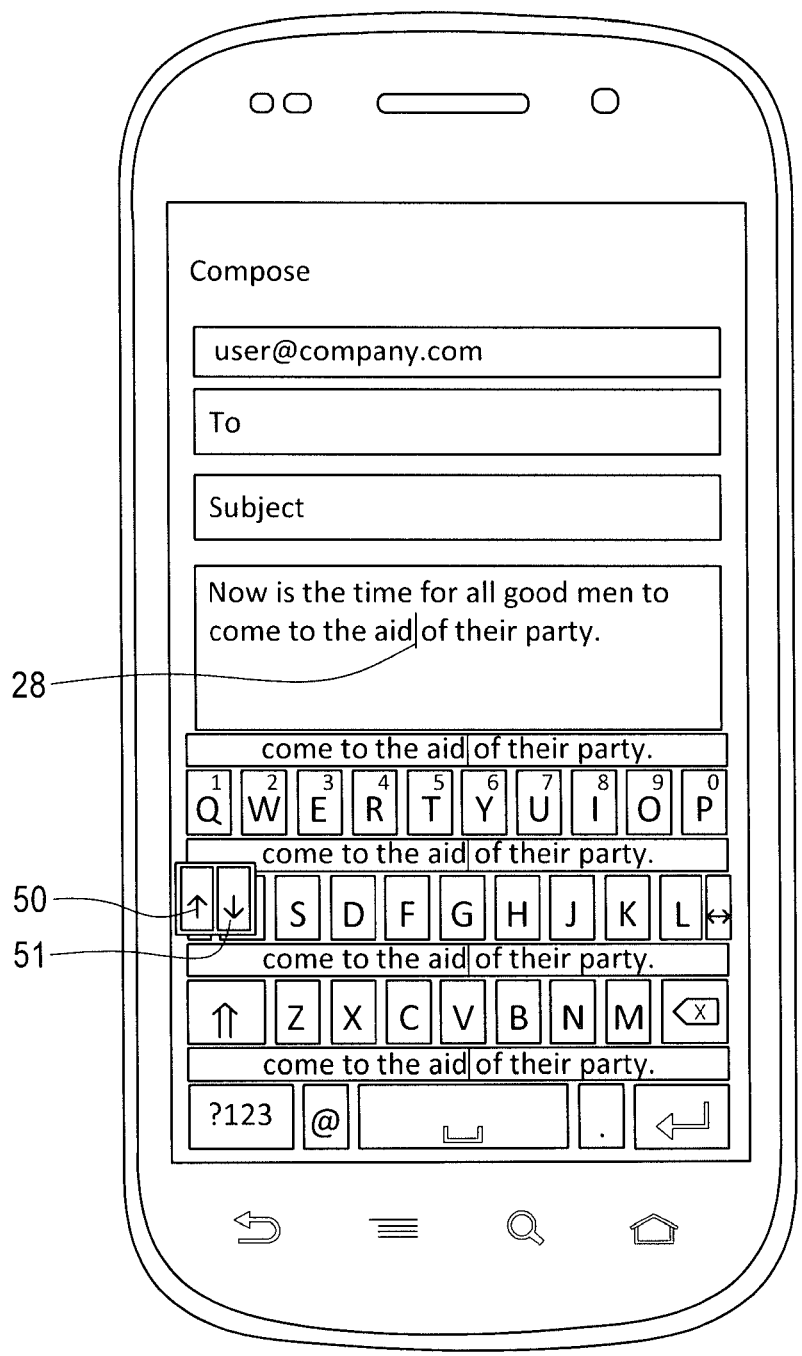
FIG. 3 shows the display of a mobile communications device with a standard QWERTY soft keyboard with four visual foveal echo fields and with up-down and left-right keys added, and the second state when the up-down key has been touched.

In an example, such as shown in FIG. 3, when the up-down ↕ control key 46 is touched by the user, it causes individual keys up 50 and down 51 to be displayed and presented to the user to move the text insertion point 28 up from text character row 30 or down.

Figure 4:
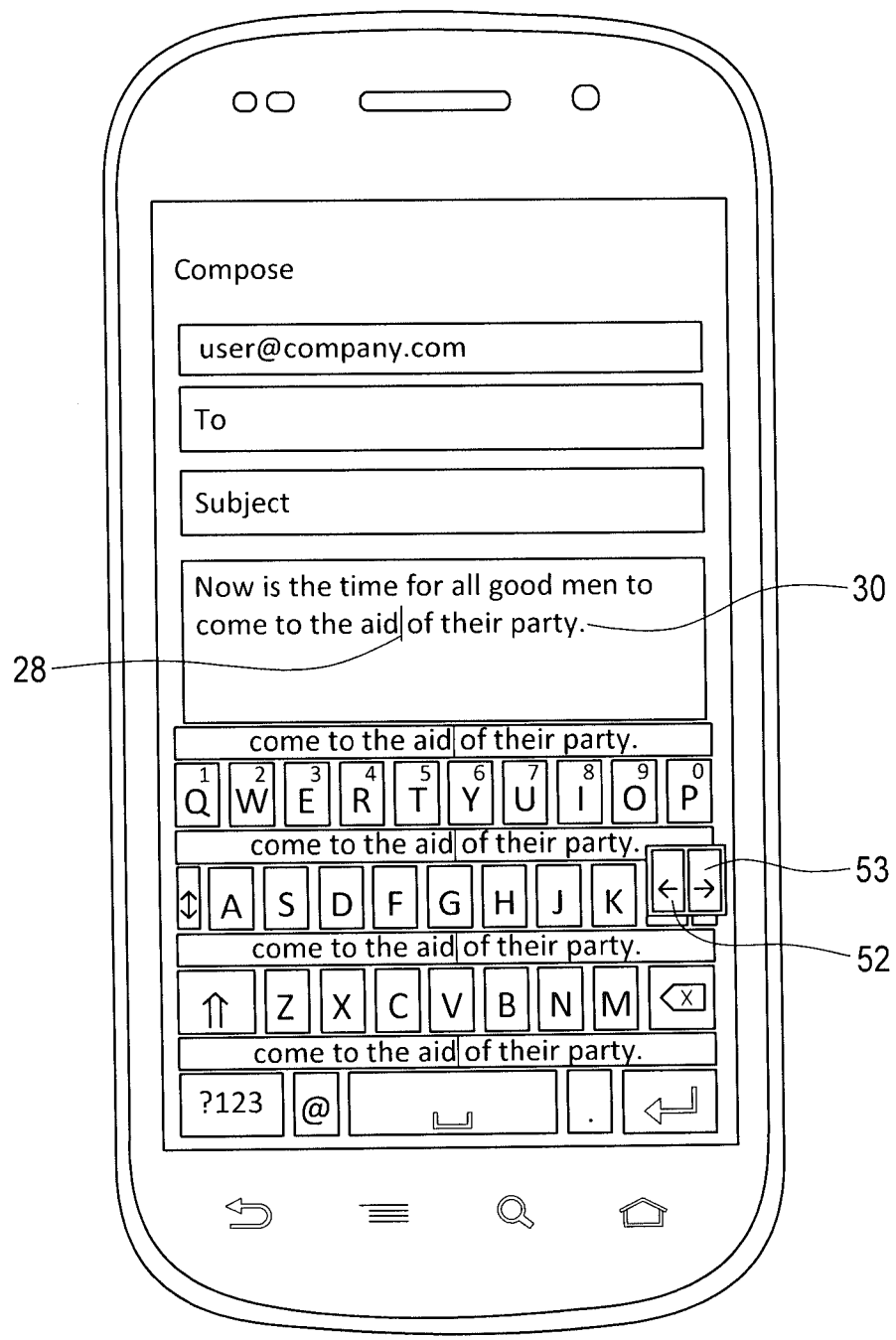
FIG. 4 shows the display of a mobile communications device with a standard QWERTY soft keyboard with four visual foveal echo fields and with up-down and left-right keys added, and the second state when the left-right key has been touched.

FIG. 4 shows the example where the user has touched-right ↔ control key 48, and individual keys left 52 and right 53 are presented to enable the user to move the text insertion point 28 to the left or right of its previous location in the center of text character row 30. It should be understood that a visual foveal echo field could also be used in conjunction with a hard keyboard that is part of a device or connected via cable or wirelessly to a device, with one or more visual foveal echo fields occupying the space between rows of keys.

Reduced Error Key Layouts

Figure 5:
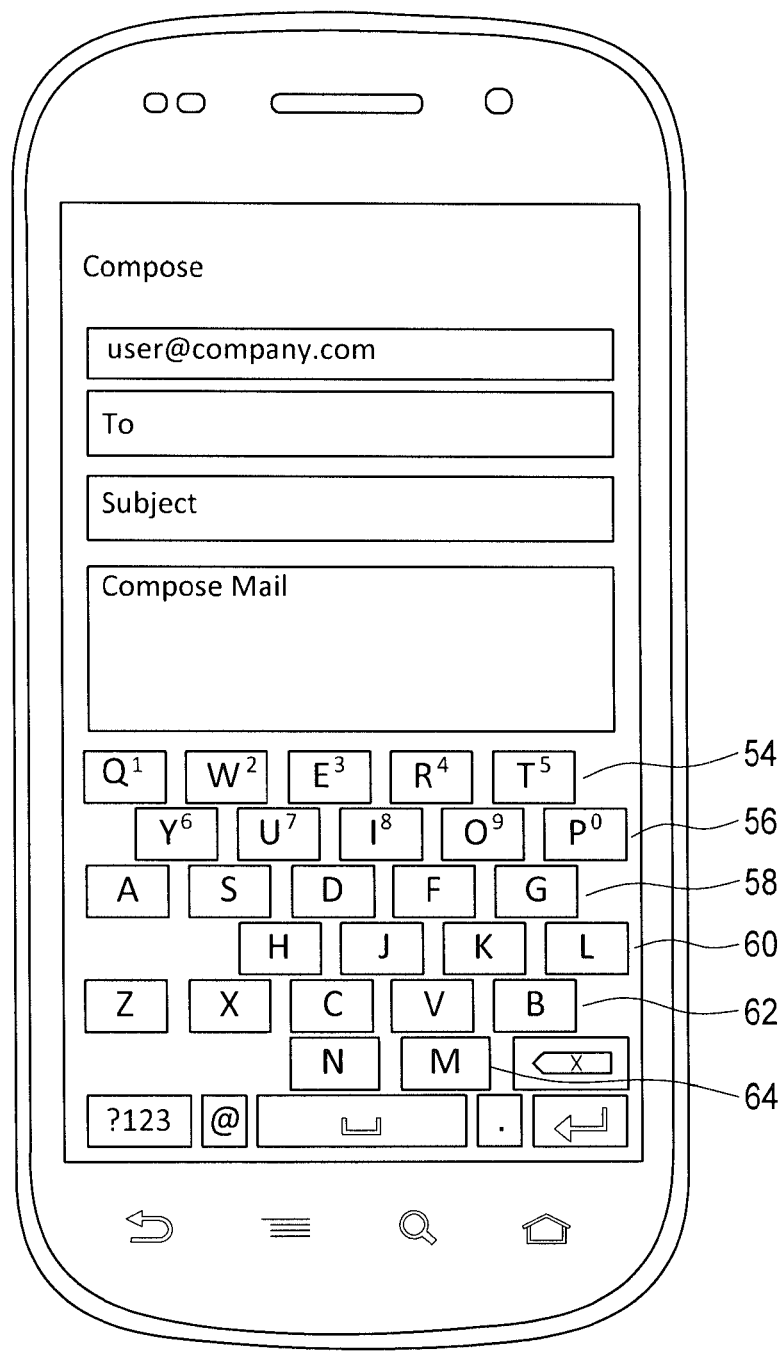
FIG. 5 shows the display of a mobile communications device with a soft keyboard long reach layout of the keys.

Because most typing errors on a smartphone or mobile communications device happen when a horizontally adjacent key is inadvertently pressed, rather than the intended key, it would be desirable if the keys were wider. But such a configuration of character keys was not thought possible because there is only so much space left-right on the device display. The solution is to split the keyboard into separate rows for the left-hand side and the right-hand side of the keyboard. There are many other forms of "split-QWERTY" keyboard layouts, but none of them interleave the rows as is done here. And these "split-QWERTY" keyboard layouts were designed for reasons other than reducing errors from inadvertently pressing or touching a horizontally adjacent key. In FIG. 5, the QWERTYUIOP row is altered into a QWERT row and a YUIOP row. Note that the combined height of the two rows is approximately the same height as a single row from the original QWERTY soft keyboard layout.

This layout is called "long reach" because it is for use by a user with longer thumbs that can reach most of the way across the device screen from either side of the display while holding the device. In this layout of a soft keyboard, there are six rows of text character keys, arranged with the first row 54 having only the text characters Q, W, E, R and T;

the second row 56 having only the text characters Y, U, I, O and P;

the third row 58 having only the text characters A, S, D, F and G;

the fourth row 60 having only the text characters H, J, K and L;

the fifth row 62 having only the text characters Z, X, C, V and B; and the sixth row 64 having the text characters N and M.

In a layout of these six rows especially adapted for use by a user with longer thumbs that can reach most of the way across the smartphone display screen in portrait mode, as shown in FIG. 5, the first 54, third 58 and fifth 62 rows are arranged left justified, the second row first character Y is positioned below the first row characters Q and W, the fourth row first character H is positioned below the third row characters S and D, and the sixth row first character N is positioned below the fifth row character C.

Figure 6:
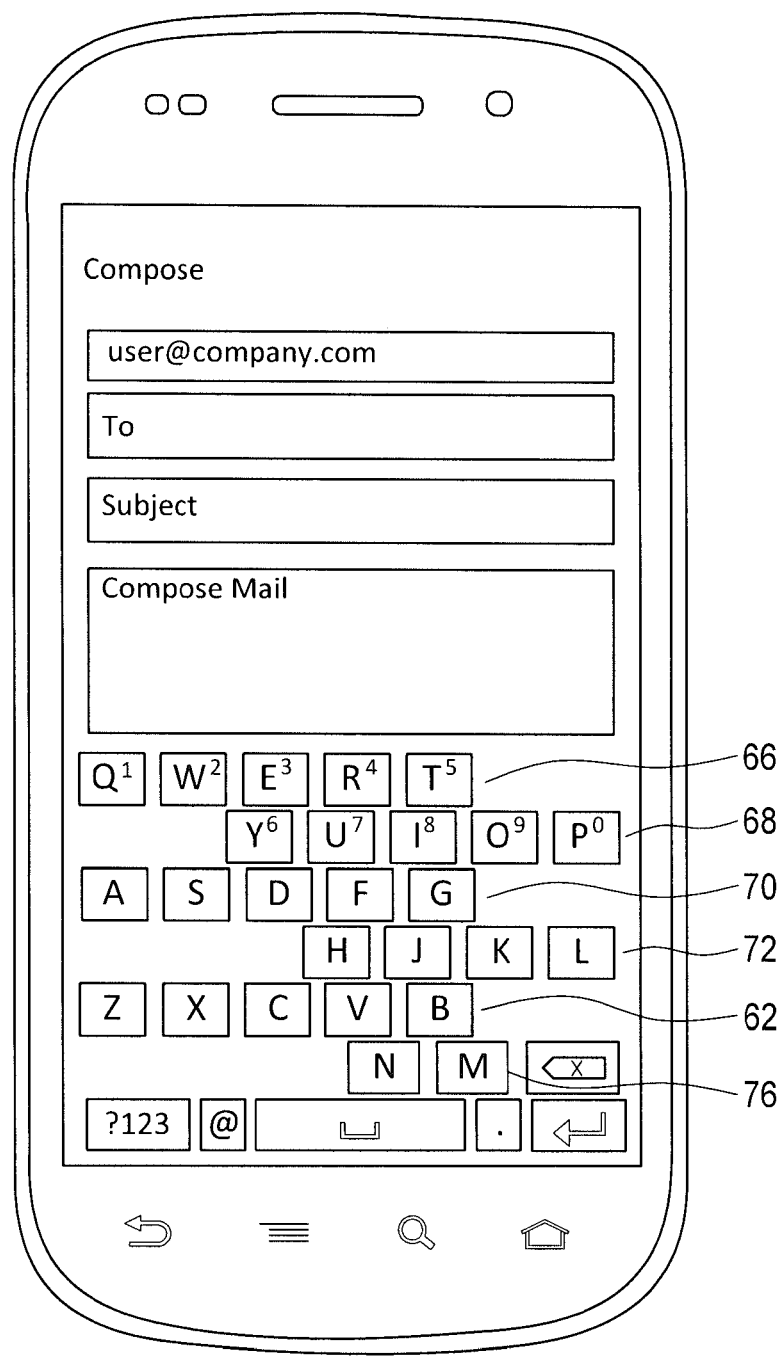
FIG. 6 shows the display of a mobile communications device with a soft keyboard short reach layout of the keys.

In another example layout of the six rows of character keys, as shown in FIG. 6, this layout is adapted for users without the longer reach across most of the smartphone display in portrait mode. In this layout, the first 66, third 70 and fifth 74 rows are arranged left justified, the second row 68 first character Y is positioned below the first row characters W and E, the fourth row 72 first character H is positioned below the third row characters D and F, and the sixth row 76 first character N is positioned below the fifth row characters V and B.

Reduced Error Keyboard Layouts and Visual Foveal Echo Fields

Figure 7:
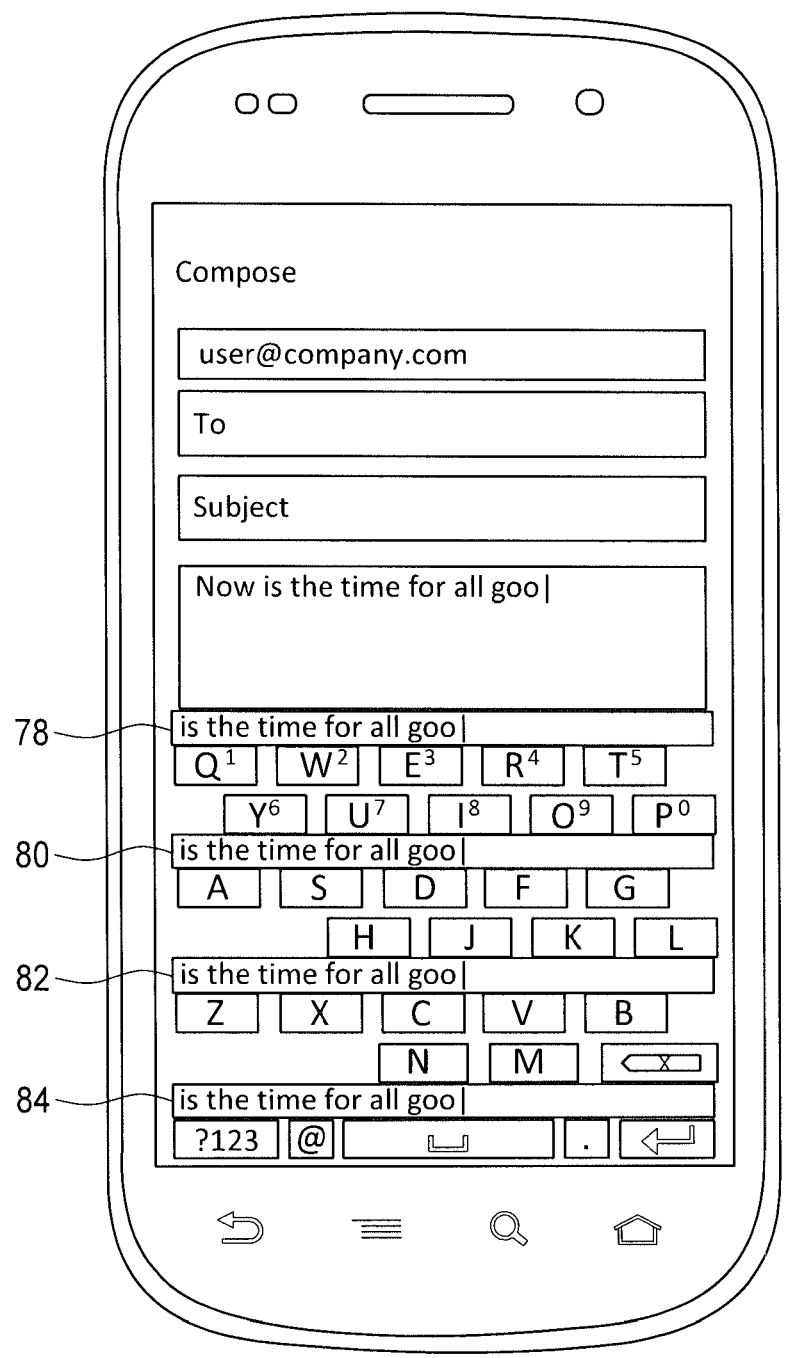
FIG. 7 shows the display of a mobile communications device with a soft keyboard long reach layout of the keys and four visual foveal echo fields.

FIG. 7 illustrates a soft keyboard layout in which the long reach keyboard layout is combined with four visual foveal echo fields 78, 80, 82 and 84.

Figure 8:
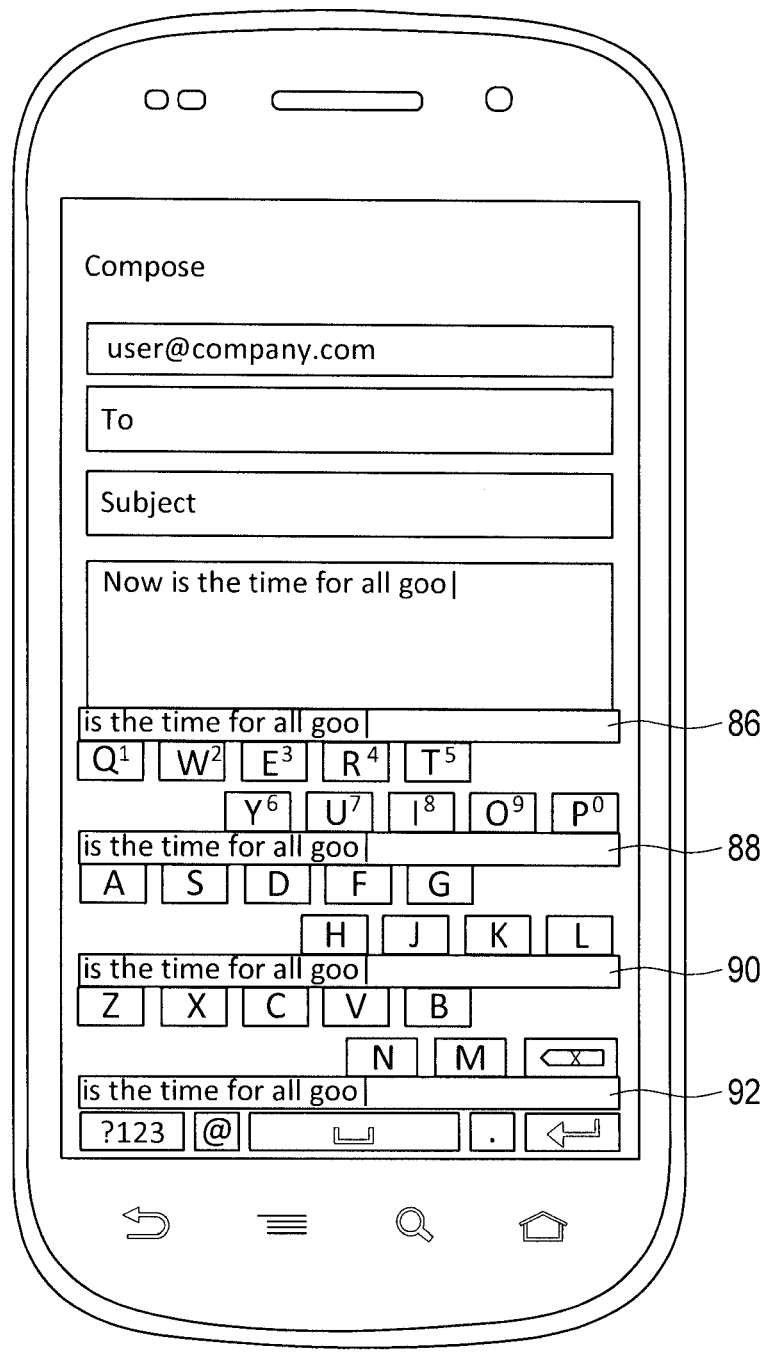
FIG. 8 shows the display of a mobile communications device with a soft keyboard short reach layout of the keys and four visual foveal echo fields.

FIG. 8 is an example of a short reach keyboard layout with four visual foveal echo fields 86, 88, 90 and 92.

Figure 9:
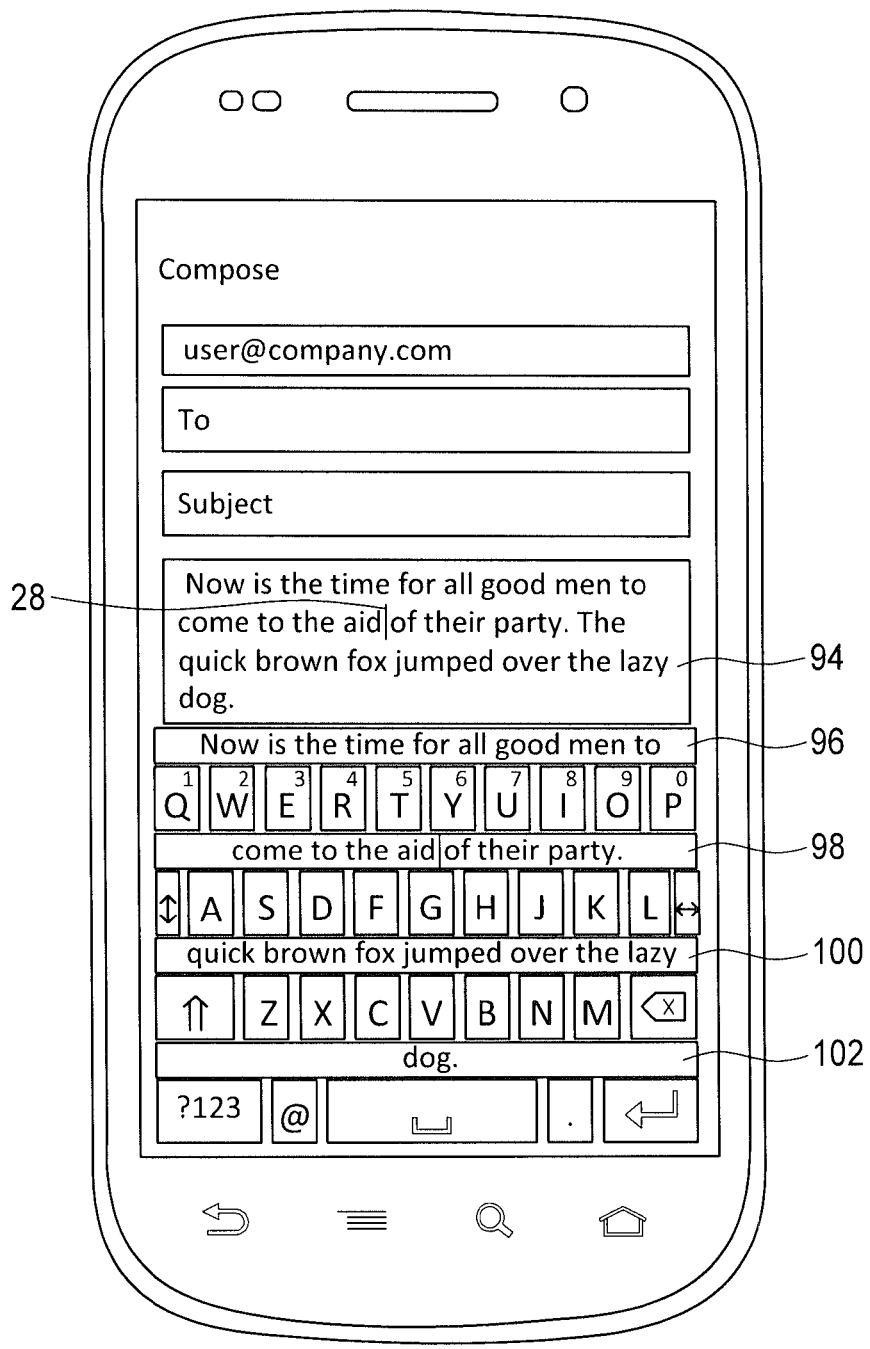
FIG. 9 shows the display of a mobile communications device with a standard QWERTY soft keyboard with four visual foveal multiline echo fields in which multiple lines of text are echoed.

FIG. 9 shows a typical QWERTY soft keyboard layout with text message field 94. In this example, there are four visual foveal echo fields 96, 98, 100 and 102. However, in FIG. 9, the four visual foveal echo fields echo multiple lines of text rather than repeating the same line of text in all four boxes. This type of presentation is referred to as visual foveal multiline echo fields. In the example shown in FIG. 9, the text insertion point 28 is in the second line of the text message field. The visual foveal multiline echo field 98 contains the characters shown in the second line of the text message field. However, this is but one example of where the text containing the text insertion point can be displayed in the visual foveal multiline echo fields. In an embodiment, any visual foveal echo field (single line or multiline) may also include metadata or label information that reminds the user which field the text input is destined for; e.g., if the field that currently has the text input focus is the Subject field, then the visual foveal echo field may also contain the word "Subject:" to so indicate that fact to the user.

Figure 10:
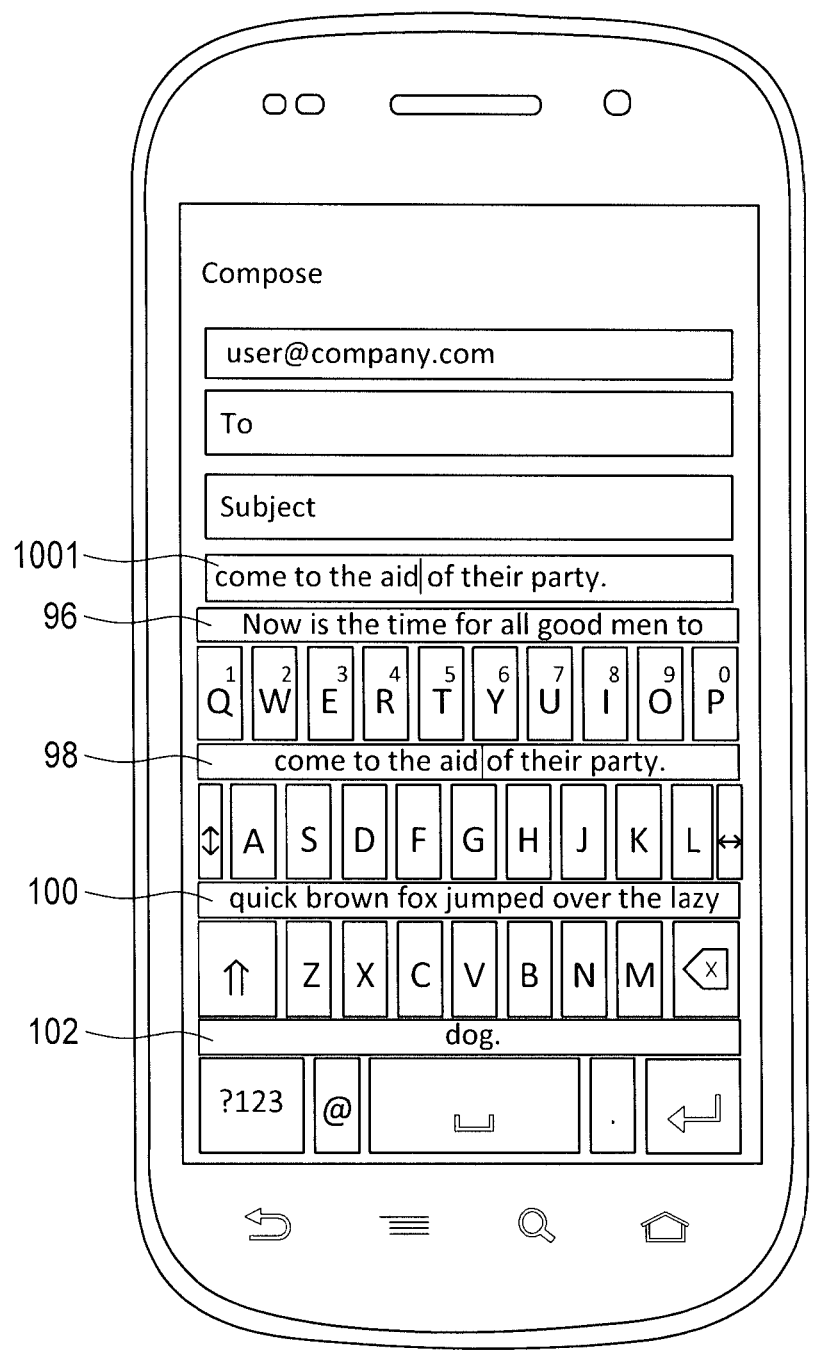
FIG. 10 shows the display of a mobile communications device with a standard QWERTY soft keyboard with four visual foveal multiline echo fields in which multiple lines of text are echoed, and the standard text entry area is reduced in size.

FIG. 10 shows the display of a mobile communications device with a standard QWERTY soft keyboard with four visual foveal multiline echo fields in which multiple lines of text are echoed, and the standard text entry area is reduced in size. As shown in FIG. 10, the display of the mobile communications device comprises visual foveal multiline echo fields (e.g., visual foveal echo fields 96, 98, 100, and 102) that echo multiple lines of text rather than repeating the same line of text in all four boxes. However, the standard text entry area 1001 is reduced in size when compared to the standard text entry area 94 of FIG. 9. In this embodiment, the keys of the QWERTUY soft keyboard have replaced a portion of the standard text entry area. As such, the embodiment of FIG. 10 provides additional space for the standard QWERTY soft keyboard that is displayed by the mobile communications device.

Figure 11:
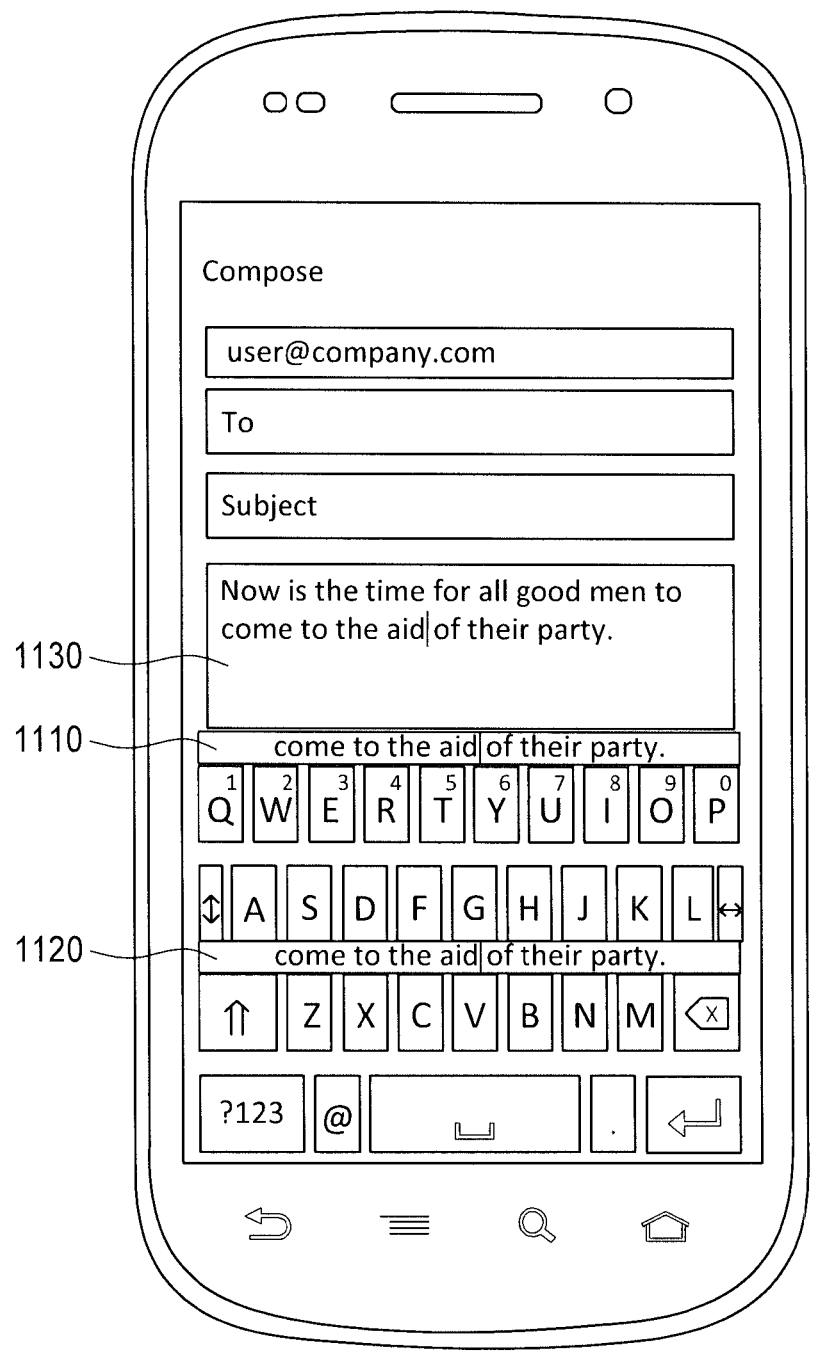
FIG. 11 shows the display of a mobile communications device with a standard QWERTY soft keyboard with two visual foveal echo fields.

FIG. 11 shows the display of a mobile communications device with a standard QWERTY soft keyboard with two visual foveal echo fields as opposed to four visual foveal echo fields. As shown, the display may comprise the two visual foveal echo fields 1110 and 1120. In some embodiments, the visual foveal echo fields 1110 and 1120 may repeat the same line of text in both boxes. In alternative embodiments, the visual foveal echo fields 1110 and 1120 may echo multiple lines of text rather than repeating the same line of text in both boxes. The first visual foveal echo field 1110 may be presented above the QWERTYUIOP row and the second visual foveal echo field 1120 may be presented between the ASDFGHJKL row and the ZXCVBNM row of the soft keyboard. Furthermore, as shown in FIG. 11, since there are only two visual foveal echo fields 1110 and 1120 instead of four visual foveal echo fields, the standard text entry area 1130 may be larger in comparison to a display that has four visual foveal echo fields.

Figure 12:
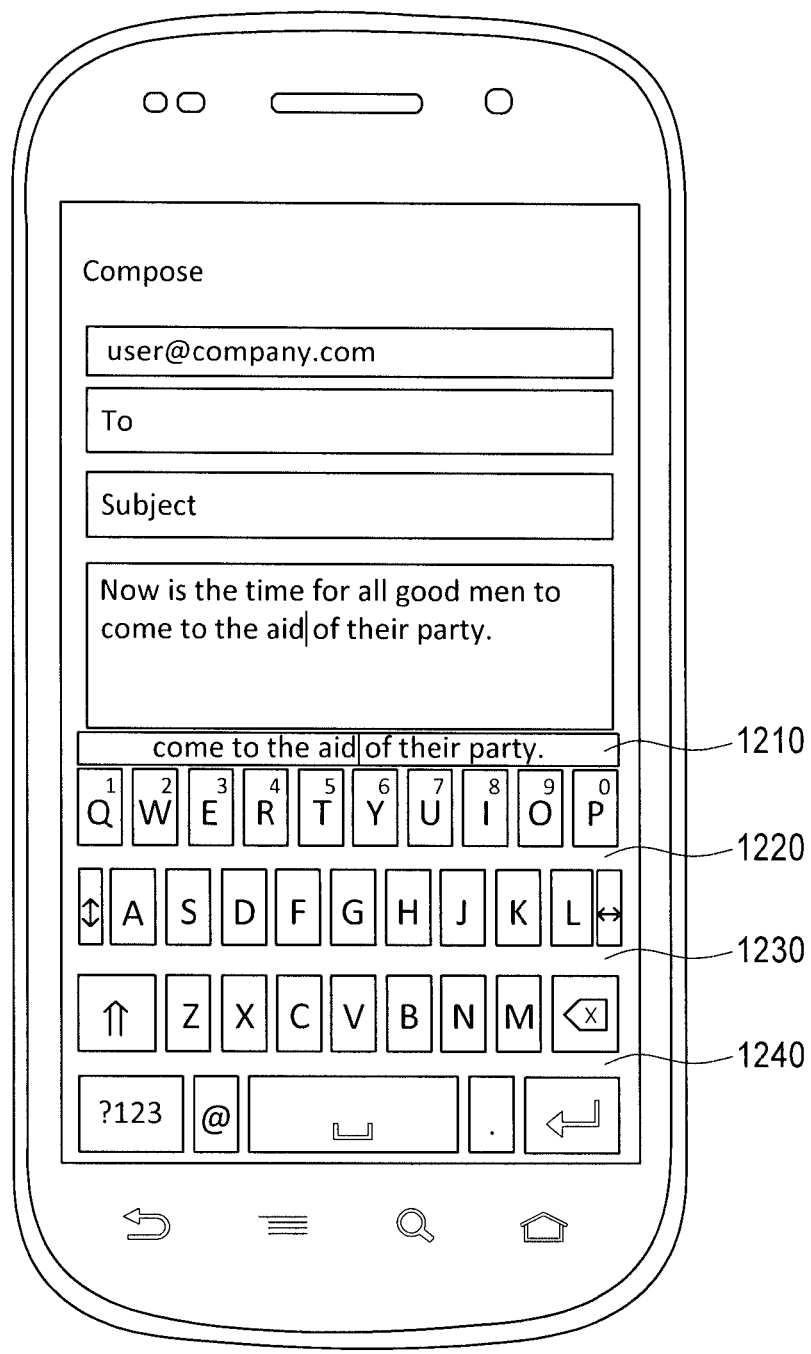
FIG. 12 shows the display of a mobile communications device with a standard QWERTY soft keyboard with one visual foveal echo field in the high position.

FIG. 12 shows the display of a mobile communications device with a standard QWERTY soft keyboard with one visual foveal echo field in the high position. In general, the visual foveal echo field of the display of the mobile communications device may be dynamically changed. In some embodiments, the location of the visual foveal echo field may be changed from one position on the display of the mobile communications device to another position on the display of the mobile communications device in response to an estimated location of a user's gaze. For example, the display of the mobile communications device may present a plurality of positions above, below, and between rows of the QWERTY soft keyboard. A visual foveal echo field position 1210 may be above the QWERTYUIOP row, a visual foveal echo field position 1220 may be between the QWERTYUIOP row and the ASDFGHJKL row of the soft keyboard, a visual foveal echo field position 1230 may be between the ASDFGHJKL row and the ZXCVBNM row of the soft keyboard, and a visual foveal echo field position 1240 may be below the ZXCVBNM row of the soft keyboard.

As previously mentioned, the location of the visual foveal echo field may be changed (e.g., from between any of visual foveal echo field positions 1210, 1220, 1230, and 1240) based on an estimated gaze of a user viewing the display of the mobile communications device. In some embodiments, the gaze of the user may be based on gaze tracking. In the same or alternative embodiments, the location of the visual foveal echo field may also be changed based on a proximity measurement of the user's thumb(s), the most recent key from the soft keyboard that has been pressed, the most likely key to be pressed next by the user on the soft keyboard, or based on n-gram prediction. As such, if the user's gaze is tracked to or around the visual foveal echo field position 1210 or if the user has pressed a key from the QWERTYUIOP row, then a visual foveal echo line may be placed at the visual foveal echo field position 1210. In some embodiments, the visual foveal echo field position 1210 may be referred to as a high position field as it is placed above the QWERTY soft keyboard. As such, the display of the mobile communications device may present a single visual foveal echo field that may be dynamically positioned based on one or more factors such as the user's gaze, proximity of the user's thumb, a most recent key from the soft keyboard that has been pressed, etc.

Figure 13:
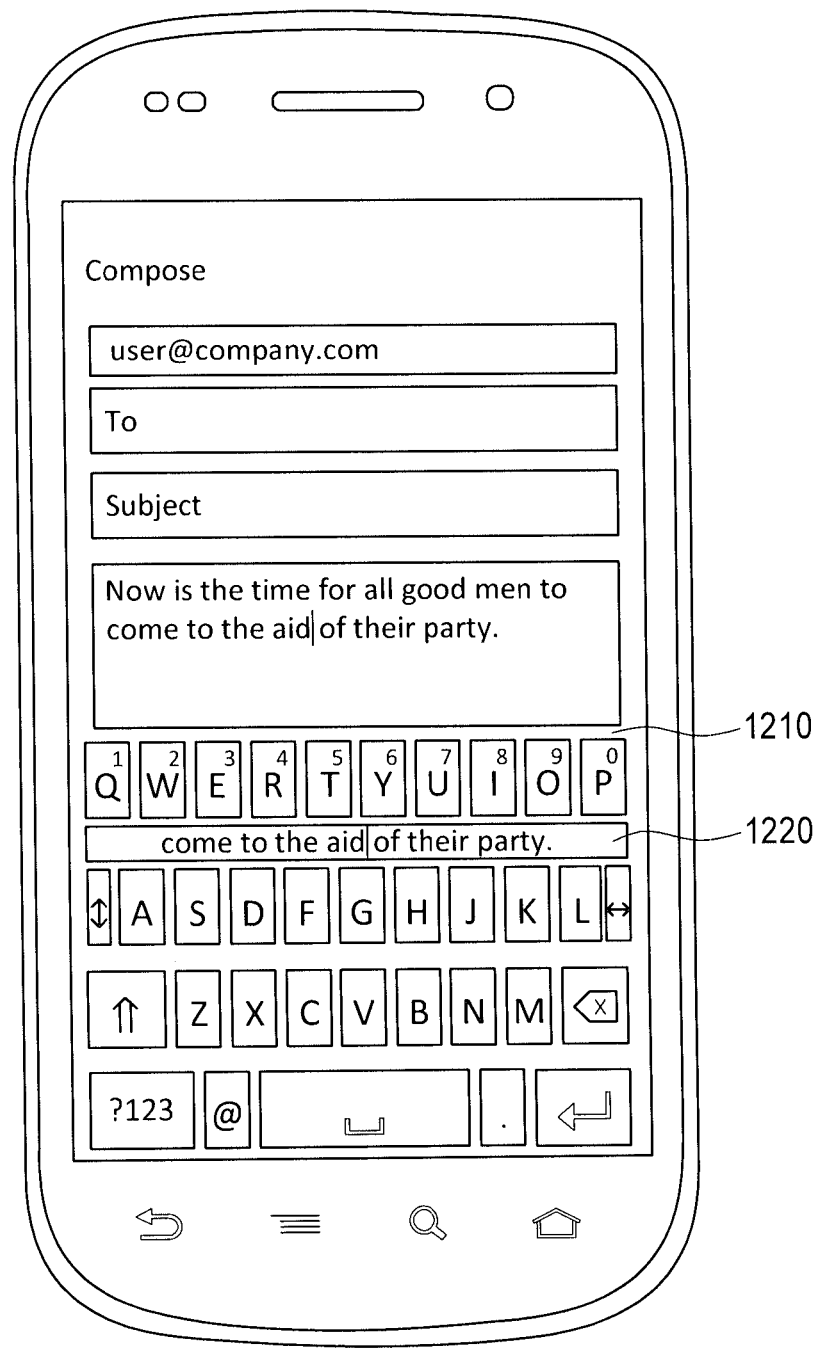
FIG. 13 shows the display of a mobile communications device with a standard QWERTY soft keyboard with one visual foveal echo field in the medium high position.

FIG. 13 shows the display of a mobile communications device with a standard QWERTY soft keyboard with one visual foveal echo field in the medium high position. As shown, the visual foveal echo line has been changed from the visual foveal echo field position 1210 (i.e., the high position) to the visual foveal echo field position 1220. In some embodiments, the visual foveal echo field position 1220 may be referred to as a medium high position as the visual foveal echo field position 1220 is between the QWERTYUIOP row and the ASDFGHJKL row of the QWERTY soft keyboard. In some embodiments, the position of the visual foveal echo field has changed from the visual foveal echo field position 1210 to the visual foveal echo field position 1220 in response to a change of the estimated location of the gaze of the user, a change of the proximity measurement of the user's thumb(s), a recent key that has been pressed (e.g., from the ASDFGHJKL row as opposed to the QWERTYUIOP row), or a change in the most likely key to be pressed by the user on the soft keyboard.

Figure 14:
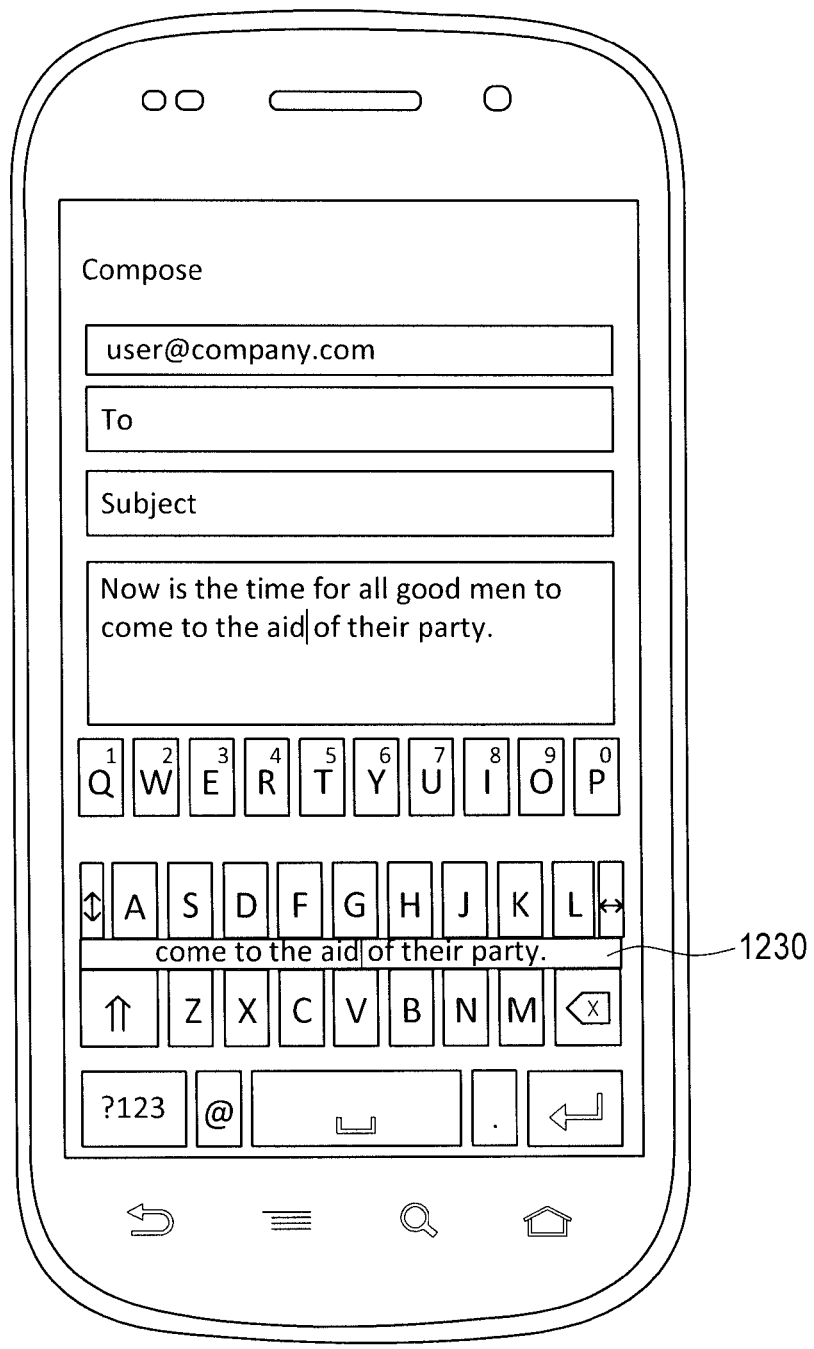
FIG. 14 shows the display of a mobile communications device with a standard QWERTY soft keyboard with one visual foveal echo field in the medium low position.

FIG. 14 shows the display of a mobile communications device with a standard QWERTY soft keyboard with one visual foveal echo field in the medium low position. As shown, the visual foveal echo line has been changed from being placed at the visual foveal echo field position 1220 (i.e., the medium high position) to being placed at the visual foveal echo field position 1230. In some embodiments, the visual foveal echo field position 1230 may be referred to as a medium low position as the visual foveal echo field position 1230 is between the ASDFGHJKL row and the ZXCVBNM row of the QWERTY soft keyboard. In some embodiments, the position of the visual foveal echo field may be changed to the medium low position in response to a change in the user's gaze or estimate of the user's gaze, measurement of user's thumb(s), and other factors as previously disclosed above.

Figure 15:
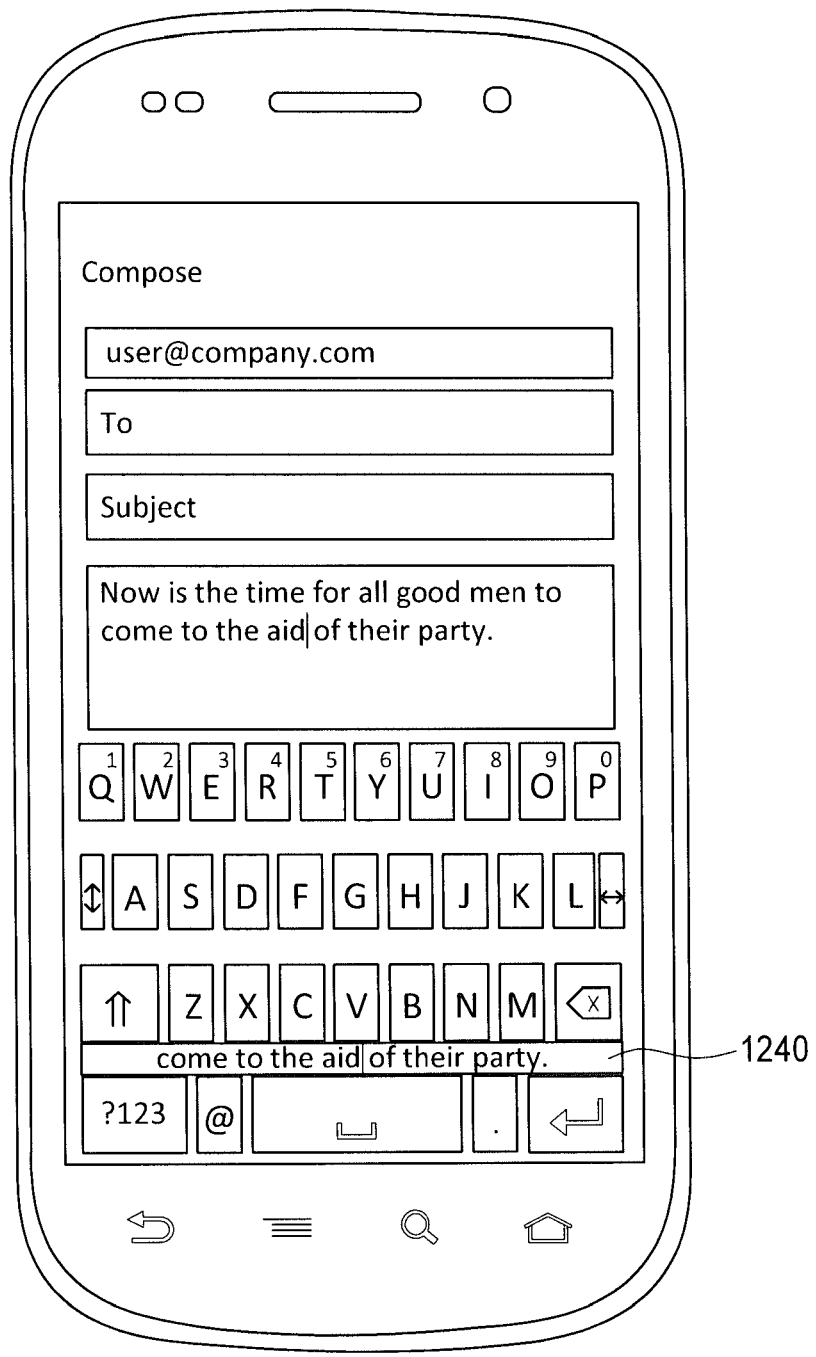
FIG. 15 shows the display of a mobile communications device with a standard QWERTY soft keyboard with one visual foveal echo field in the low position.

FIG. 15 shows the display of a mobile communications device with a standard QWERTY soft keyboard with one visual foveal echo field in the low position. As shown, the visual foveal echo field has been changed from being placed at the visual foveal echo field position 1230 (i.e., the medium low position) to being placed at the visual foveal echo field position 1240. In some embodiments, the visual foveal echo field position 1240 may be referred to as a low position as the visual foveal echo field position 1240 is below the ZXCVBNM row of the QWERTY soft keyboard. Similarly, the position of the visual foveal echo field may be changed to the low position in response to a change in the user's gaze or an estimate of the user's gaze, measurement of user's thumb(s), interaction with keys of the QWERTY soft keyboard, and other factors as previously disclosed above.

As such, the display of the mobile communications device may display a soft keyboard. In some embodiments, the display presents a single visual foveal echo field above or below the soft keyboard or between rows of the soft keyboard. The visual foveal echo field may change from a first position on the display of the mobile communications device (e.g., a first visual foveal echo field position) to a second position on the display of the mobile communications device (e.g., a second visual foveal echo field position) based in part on a single factor or a combination of factors including a user's gaze, an estimate of the user's gaze, proximity measure of thumb(s) of the user, a most recent key from the soft keyboard that has been pressed, a most likely key to be pressed next on the soft keyboard, and/or an n-gram prediction.

Figure 16:
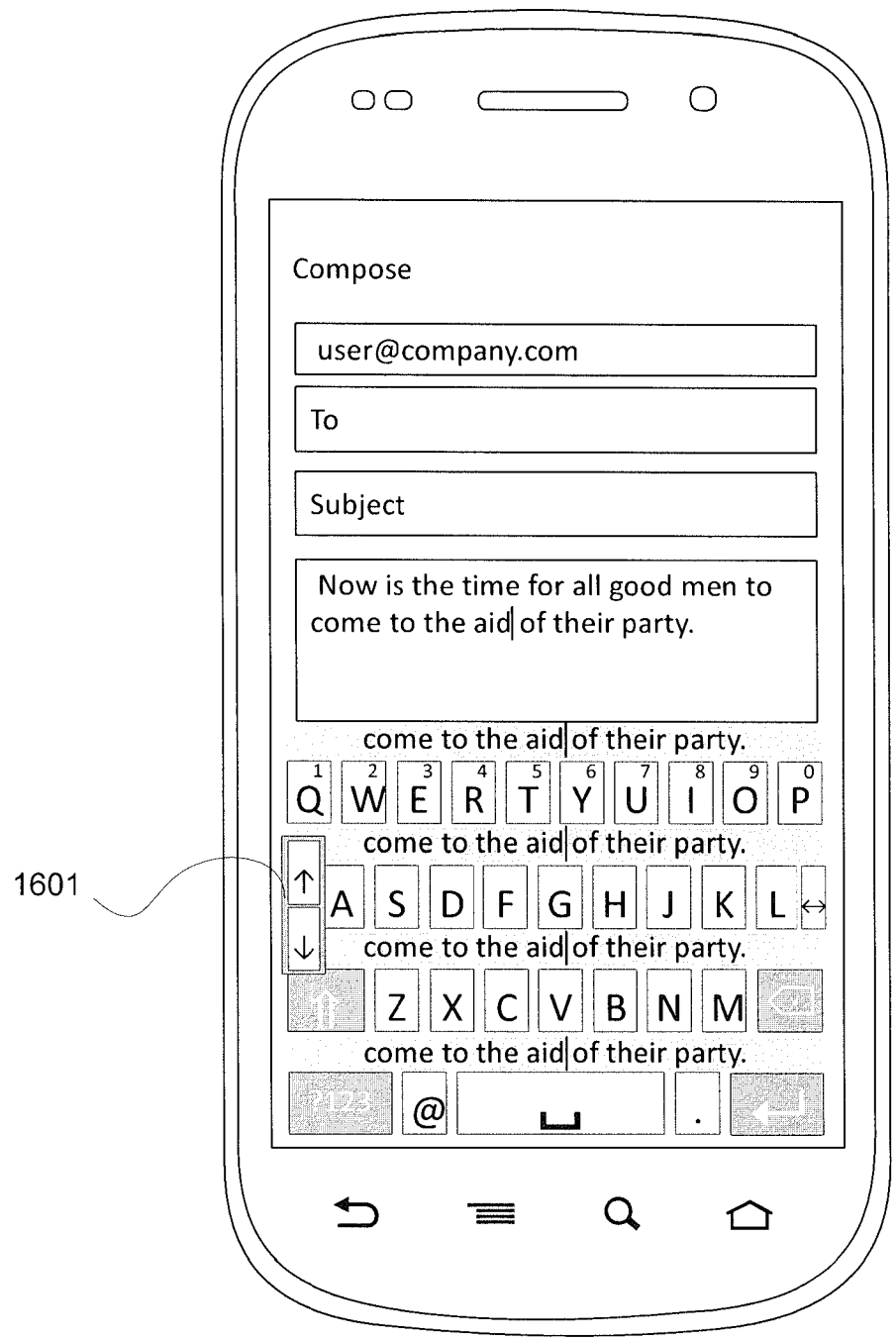
FIG. 16 shows the display of a mobile communications device with up and down keys arranged in a line to perform a rubber band scrolling interaction.

FIG. 16 shows the display of a mobile communications device with up and down keys arranged in a line to perform a rubber band scrolling interaction. As shown, the soft keyboard may include up and down keys arranged in a line on the soft keyboard. In some embodiments, the up and down keys may be used to support linear interaction (e.g., rubber band scrolling). For example, the user's finger, while in contact with the up and down keys on the display, may move up or down and the text cursor may correspondingly move up or down lines of text with corresponding resulting changes in the text that is displayed in the visual foveal echo field.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

Audio or Tactile Feedback for Finger Position or Typing

In an embodiment, a device which has a touch screen surface that can differentiate between a user resting the user's fingers or thumbs on the surface and pressing the surface to type, the device can provide audio or tactile feedback or both regarding the relative position of the user's fingers or thumbs to the position of the soft keyboard on the device. For example, on a conventional hard keyboard, there is a physical difference on the F and H keys (home keys) that is detectable by the user and enables the user to position the user's index fingers on the F and H keys. One form of feedback provides an auditory or tactile feedback to the user when the fingers are positioned on the home keys. Tactile feedback can include vibrations of the device provided by a multifunction transducer technology (MFT) or rotary mass vibrator (RMV) or pager motor or piezoelectric actuators; tactile feedback can include technologies which can change the perceptible surface texture by controlling electric charge on the display panel film without using mechanical vibrations or technologies which can physically reconfigure the surface of the display mechanically to form ridges or lines or soft buttons. Feedback can be purely auditory (e.g., a soft click) or audio-haptic such as a synchronous sound and tactile feedback.

In an embodiment, the device can use the sensed positions of a user's thumbs or fingers to reposition or resize the soft keyboard layout to align with the sensed position of the user's thumbs or fingers.

In an embodiment, the soft keyboard can provide specific and different feedback to the user depending on which key has been pressed. Such feedback can be audio, haptic, or a combination of both. Users are capable of differentiating multiple different tactile vibrations with the tip of the finger or thumb. Using different feedback signals for adjacent keys provides the user with a feedback regarding which key has been pressed. In an embodiment, the audio that corresponds to pronouncing the name of the letter on a key is used for audio feedback, or for tactile feedback, or a combination thereof. Using an audio signal for tactile feedback involves using the audio waveform to modulate a device vibration or surface roughness characteristic or physical surface reconfiguration. For example, if the user typed the key for the letter 'v' the audio waveform used to modulate a tactile feedback would be that of a person pronouncing "vee." The essential characteristic of such haptic feedback is not so much that the user can directly recognize a letter from the haptic transmission of a pronounced letter as the fact that each such haptic feedback signal is different, and in particular, is different for adjacent keys on the soft keyboard.

What is claimed is:

1. A mobile communications device comprising a touch screen display, at least one processor, memory, and at least one program, wherein the at least one program is stored in the memory and configured to be executed by the at least one processor, the at least one program including instructions for:
   a) providing on the touch screen display a message field for displaying characters entered by a mobile communications device user;
   b) providing on the touch screen display a soft keyboard including a plurality of rows of soft keys, the soft keys including character keys which when touched by the user enter characters into the message field; and
   c) providing on the touch screen display a plurality of visual foveal echo fields, each one of the plurality of echo fields located between different consecutive rows of the plurality of rows of soft keys and providing an unobstructed view of the consecutive rows, each echo field for containing at least a subset of any characters entered by the user into the message field, for containing only characters entered by the user, and for containing the characters in the order entered wherein:
      i. a first visual foveal echo field of the plurality is located between a first row and a second row of soft keys, and
      ii. a second visual foveal echo field of the plurality is located between the second row and a third row of soft keys.

2. The mobile communications device of claim 1 further comprising instructions for:
   providing on the touch screen display a vertical up down key that when touched presents separate up and down keys to permit the user to select the row of characters in the message field that are presented in at least one visual foveal echo field.

3. The mobile communications device of claim 1 further comprising instructions for:
   providing on the touch screen display a horizontal left right key that when touched presents separate left and right keys to permit the user to select the characters in a particular row in the message field that are presented in at least one visual foveal echo field.

4. A mobile communications device comprising a touch screen display, at least one processor, memory, and at least one program, wherein the at least one program is stored in the memory and configured to be executed by the at least one processor, the at least one program including instructions for:
 a) providing on the touch screen display a message field for displaying text characters entered by a mobile communications device user
 b) providing on the touch screen display a soft keyboard including six rows of text character keys which when touched by the user enter text characters into the message field, the rows arranged such that
  the first row has only the text characters Q, W, E, R and T;
  the second row has only the text characters Y, U, I, O and P;
  the third row has only the text characters A, S, D, F and G;
  the fourth row has only the text characters H, J, K and L;
  the fifth row has only the text characters Z, X, C, V and B; and
  the sixth row has the text characters N and M; and
 c) providing on the touch screen display four visual foveal echo fields, each echo field for containing at least a subset of any text characters entered by the user into the message field, for containing only characters entered by the user, and for containing the characters in the order entered wherein:
  i. the first visual foveal echo field is located between the message field and the first row of soft keys,
  ii. the second visual foveal echo field is located between the second row and third row of soft keys,
  iii. the third visual foveal echo field is located between the fourth row and fifth row of soft keys, and
  iv. the fourth visual foveal echo field is located below the sixth row of soft keys.

5. The mobile communications device of claim 4 wherein the instructions provide that the first, third and fifth rows are arranged left justified, the second row first character Y is positioned below the first row characters Q and W, the fourth row first character H is positioned below the third row characters S and D, and the sixth row first character N is positioned below the fifth row character C.

6. The mobile communications device of claim 4 wherein the instructions provide that the first, third and fifth rows are arranged left justified, the second row first character Y is positioned below the first row characters W and E, the fourth row first character H is positioned below the third row characters D and F, and the sixth row first character N is positioned below the fifth row characters V and B.

7. The mobile communications device of claim 4 further comprising instructions for:
 providing on the touch screen display a vertical up down key that when touched presents separate up and down keys to permit the user to select the row of text characters in the message field that are presented in at least one visual foveal echo field.

8. The mobile communications device of claim 4 further comprising instructions for:
 providing on the touch screen display a horizontal left right key that when touched presents separate left and right keys to permit the user to select the text characters in a particular row in the message field that are presented in at least one visual foveal echo field.

9. The mobile communications device of claim 1, wherein the instructions provide that each foveal echo field contains the same subset of characters.

10. The mobile communications device of claim 4 wherein the instructions provide that each foveal echo field contains the same subset of characters.

11. The mobile communications device of claim 9, wherein the instructions provide that the subset contains the last character entered.

12. The mobile communications device of claim 10, wherein the instructions provide that the subset contains the last character entered.

13. The mobile communications device of claim 1, wherein the instructions provide that the plurality of rows of soft keys includes four rows of soft keys, the plurality of visual foveal echo fields includes three visual foveal echo fields, and:
 i. the first visual foveal echo field is located between the first row and second row of soft keys,
 ii. the second visual foveal echo field is located between the second row and third row of soft keys, and
 iii. the third visual foveal echo field is located between the third row and fourth row of soft keys.

14. A method for implementing a graphical user interface using a mobile communications device, the method comprising:
 a) providing, on a visual display of the mobile communications device, a message field for displaying characters entered by a mobile communications device user;
 b) providing, on the visual display, a soft keyboard including a plurality of rows of soft keys, the soft keys including character keys which when touched by the user enter characters into the message field; and
 c) providing, on the visual display, a plurality of visual foveal echo fields, each one of the plurality of echo fields located between different consecutive rows of the plurality of rows of soft keys and providing an unobstructed view of the consecutive rows, each echo field for containing at least a subset of any characters entered by the user into the message field, for containing only characters entered by the user, and for containing the characters in the order entered wherein:
  i. a first visual foveal echo field of the plurality is located between a first row and a second row of soft keys, and
  ii. a second visual foveal echo field of the plurality is located between the second row and a third row of soft keys.

15. The method of claim 14, further comprising:
 providing on the touch screen display a vertical up down key that when touched presents separate up and down keys to permit the user to select the row of characters in the message field that are presented in at least one visual foveal echo field.

16. The method of claim 14, further comprising:
 providing on the touch screen display a horizontal left right key that when touched presents separate left and right keys to permit the user to select the characters in a particular row in the message field that are presented in at least one visual foveal echo field.

17. The method of claim 14, wherein each foveal echo field is provided with the same subset of characters.

18. The method of claim 17, wherein the subset contains the last character entered.

19. The method of claim 14, wherein the plurality of rows of soft keys includes four rows of soft keys, wherein the plurality of visual foveal echo fields includes three visual foveal echo fields, and wherein:
 i. the first visual foveal echo field is located between the first row and second row of soft keys,
 ii. the second visual foveal echo field is located between the second row and third row of soft keys, and iii. the third visual foveal echo field is located between the third row and fourth row of soft keys.

20. The method of claim 14, wherein:
a) the soft keyboard includes six rows of text character keys, the rows arranged such that
   i. the first row has only the text characters Q, W, E, R and T;
   ii. the second row has only the text characters Y, U, I, O and P;
   iii. the third row has only the text characters A, S, D, F and G;
   iv. the fourth row has only the text characters H, J, K and L;
   v. the fifth row has only the text characters Z, X, C, V and B; and
   vi. the sixth row has the text characters N and M; and
b) the plurality of visual foveal echo fields includes four visual foveal echo fields, wherein:
   i. the first visual foveal echo field is located between the message field and the first row of soft keys,
   ii. the second visual foveal echo field is located between the second row and third rows of soft keys,
   iii. the third visual foveal echo field is located between the fourth row and fifth row of soft keys, and
   iv. the fourth visual foveal echo field is located below the sixth row of soft keys.

\* \* \* \* \*